UNITED STATES PATENT OFFICE.

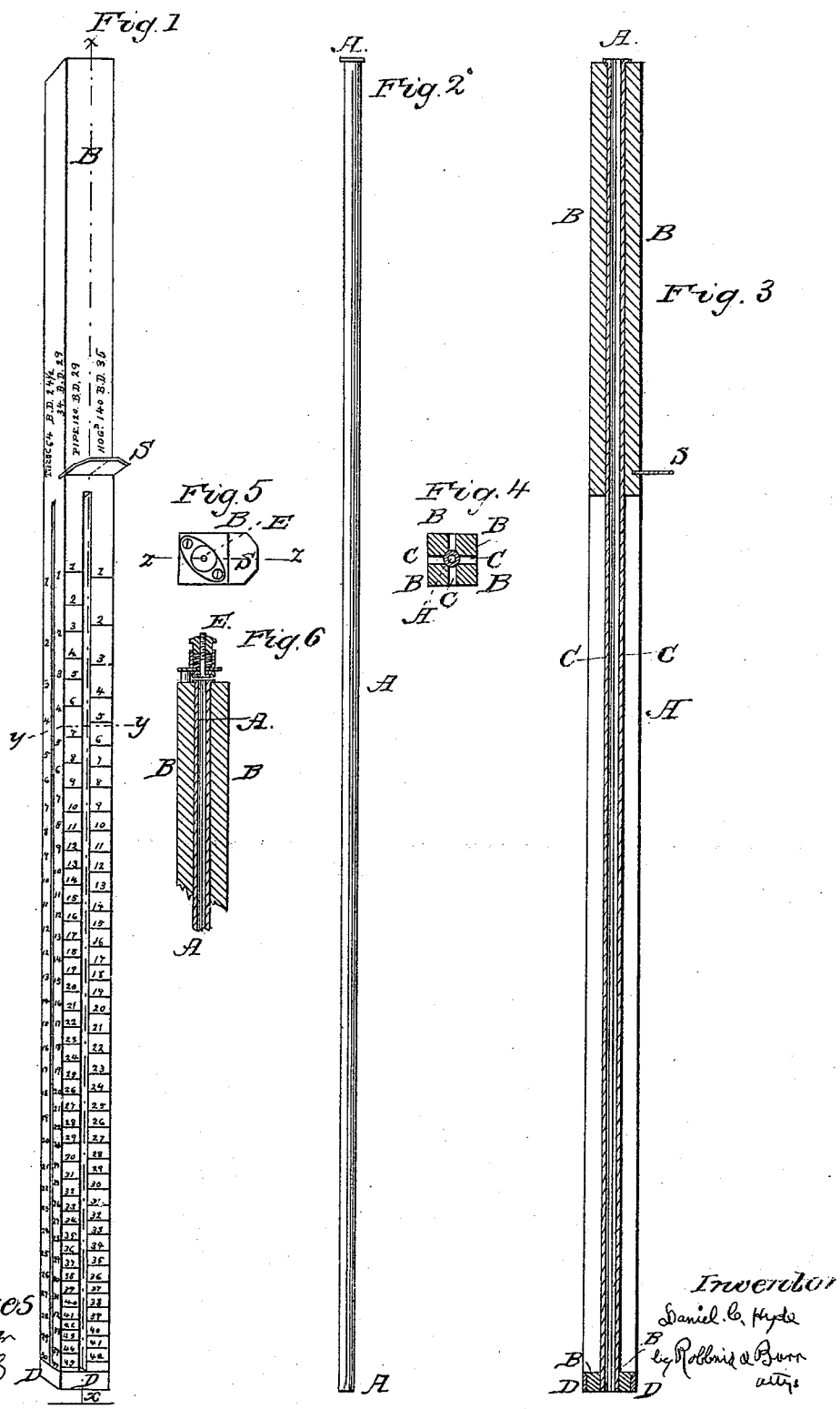

DANIEL C. HYDE, OF NEW YORK, N. Y.

IMPROVEMENT IN GAGING-RODS FOR LIQUOR-CASKS.

Specification forming part of Letters Patent No. 38,681, dated May 26, 1863.

*To all whom it may concern:*

Be it known that I, DANIEL C. HYDE, of the city, county, and State of New York, have invented a new and useful improvement in "wantage" or gaging-rods for determining the liquid contents of casks; and I do hereby declare that the following is a clear and exact description thereof, reference being had to the accompanying drawings, making a part of this specification.

Figure 1 is a perspective view of one of my improved wantage or gage rods; Fig. 2, a view of the transparent indicating-tube, constituting the main feature of my invention; Fig. 3, a longitudinal section in the line $x$ $x$ of Fig. 1. Fig. 4 is a transverse section of my instrument in the line $y$ $y$ of Fig. 1; Fig. 5, a top or end view of my improved gaging-rod when fitted with a spring-valve; and Fig. 6 a partial section in the line $z$ $z$ of Fig. 5, showing more clearly the details and arrangement of the top valve and spring.

My invention is designed to ascertain either the wantage in a cask or package of liquid, or the amount of fluid contained therein, with more certainty, ease, and accuracy than can be done with the instruments heretofore used for this purpose. Its principal feature consists of an indicating tube or cylinder, A, Figs. 2 and 1, made of transparent glass, or its equivalent, and left open at either end. By immersing such a tube in any liquid the fluid particles will immediately rise therein to the height of their proper level. If, however, the upper end or orifice of the tube be hermetically closed before it is withdrawn from the liquid the simple pressure of the atmosphere will prevent so much as is contained in the tube from escaping upon its emersion therefrom and retain it confined in a fixed position therein, so long as the tube is kept in a vertical position, or until the orifice be reopened. It is evident that the height of the column of liquid thus confined in the tube will indicate the depth of its previous immersion in the body of the fluid, and by comparing this column with a properly-graduated scale the quantity of liquid in any given cask or vessel can be accurately ascertained almost at a glance.

In manufacturing my improved wantage and gaging rods for ordinary purposes I inclose the entire length of the indicating-tube A within the center of a square slitted rod, B, Fig. 1, made of wood, metal, gutta-percha, or any other suitable material, so that either end of the rod shall be flush with the ends of the inclosed tube. Suitable gaging-scales are laid or marked off upon the four sides or faces of this square rod, each adapted to a particular form or size of cask, designated at the top of the scale by letters and figures denoting, first, its capacity, and, next, its bung diameter.

The graduation of my improved instrument is similar to that found upon the gaging-rods now in use, and to insure accuracy is made thereon by a graduating-machine. Central slits, C C, Figs. 1 and 4, are cut through the rod at right angles with each other, and extend up from its foot to the initial point of the scales marked upon its sides, the lower end of the rod being bound with a suitable metallic ferrule, D, Fig. 1. The indicating-tube A is inserted and secured within a longitudinal aperture formed in the center of the rod at the intersection of these open slits C C, as shown in the cross-section, Fig. 4, and is visible through the same upon each of the graduated faces of the bar or rod.

The indicating-tube A in my improved wantage or gaging rod may be closed hermetically at pleasure by the simple pressure of the finger upon its upper end, which is finished off evenly for the purpose, as illustrated in Figs. 1 and 3 of the accompanying drawings; but, to perfect the instrument, I intend to secure upon the top end of the rod B a simple, spring-actuated valve, O, Fig. 6, made of rubber or other elastic material, for the purpose of closing tightly the orifice of the tube, as shown in Figs. 5 and 6. In this valve arrangement the resistance of the spiral valve-spring is overcome and the valve O closed down as a cushion upon the end of the tube by simple pressure upon the head or button E, Figs. 6 and 5.

In ascertaining the wantage in any given cask my improved wantage rod is inserted therein through its bung-hole until a suitable stop, S, Figs. 1 and 3, projecting from one side of the rod in a proper position with reference to the graduated scale thereon, will catch under the bung-stave. The orifice at the upper end of the indicating-tube is then closed by pressure of the finger thereon, either directly, as in the rod, Fig. 1, or through a valve, E O, as in Fig. 6, and the instrument withdrawn.

The height of the column of liquid retained in the transparent tube will, by reference to the scale graduated for a cask of the capacity given, suffice to determine the number of gallons wanting therein. Upon releasing the valve or removing the finger from the orifice of the tube its contents will at once flow out. By the same process either the contents or "ullage" of a cask may also be accurately obtained.

Although I prefer to protect and arrange the indicating-tube A in the manner herein described, I do not limit my claim to the particular form of rod here given. The tube may be protected and combined with the necessary scales and the rod manufactured in many different forms or styles. In fact, my improved gaging-rod may be made wholly of glass or other transparent material with graduated scales marked directly thereon. Hence,

What I claim as my invention, and desire to secure by Letters Patent, is—

1. The combination and arrangement of a transparent indicating-tube, with any suitably-graduated scale or series of scales, for the purpose of ascertaining and measuring the liquid contents of casks or other vessels, substantially as herein set forth.

2. The combination of a suitable valve, O, or its equivalent, with the end of a transparent indicating-tube, A, substantially as and for the purpose herein set forth.

This specification of my improvement in wantage and gaging rods signed by me this 14th day of March, A. D. 1863.

D. C. HYDE.

In presence of—
JOHN H. CONKLIN,
GEORGE N. CONKLIN.